United States Patent Office 3,285,080
Patented Nov. 15, 1966

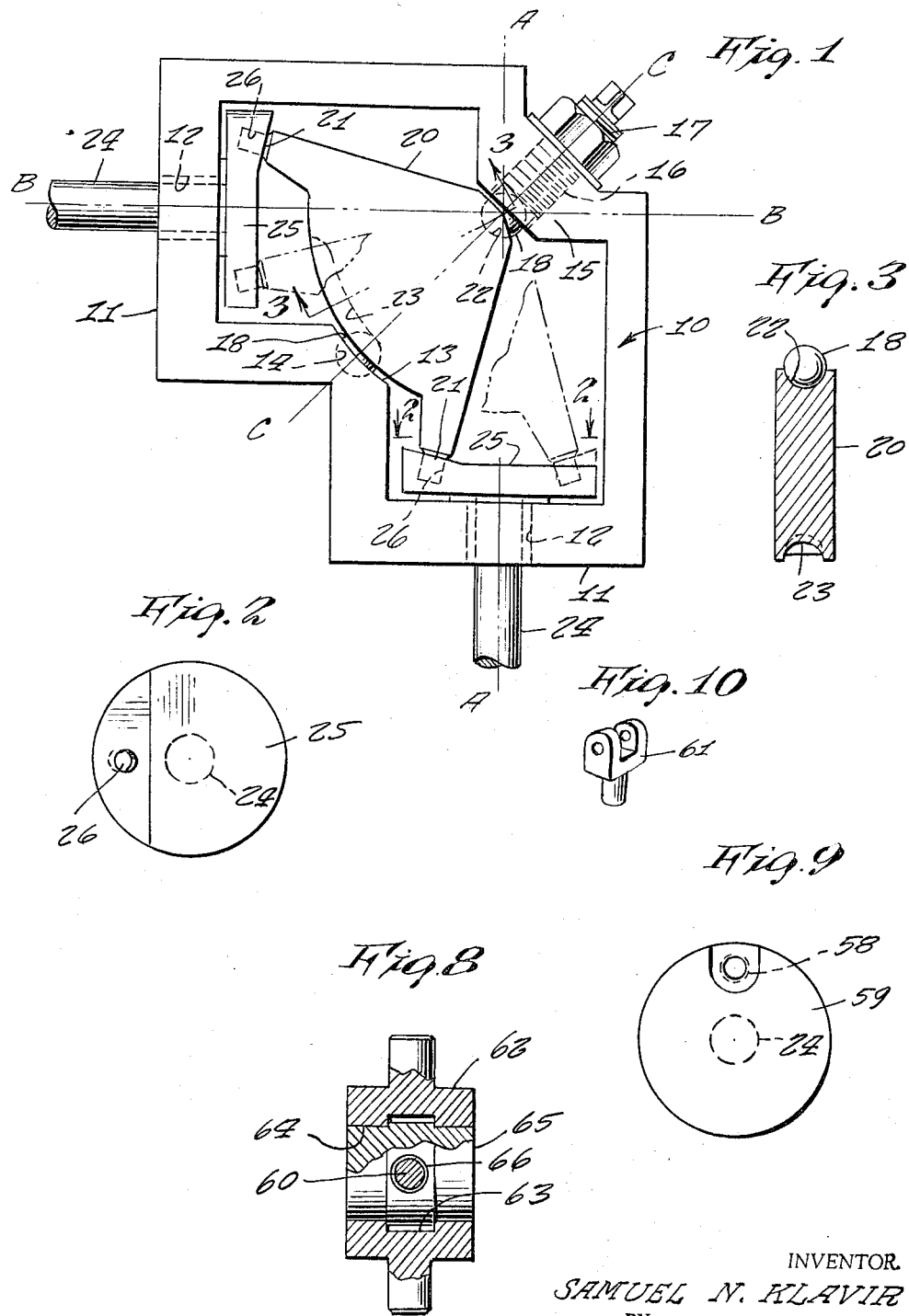

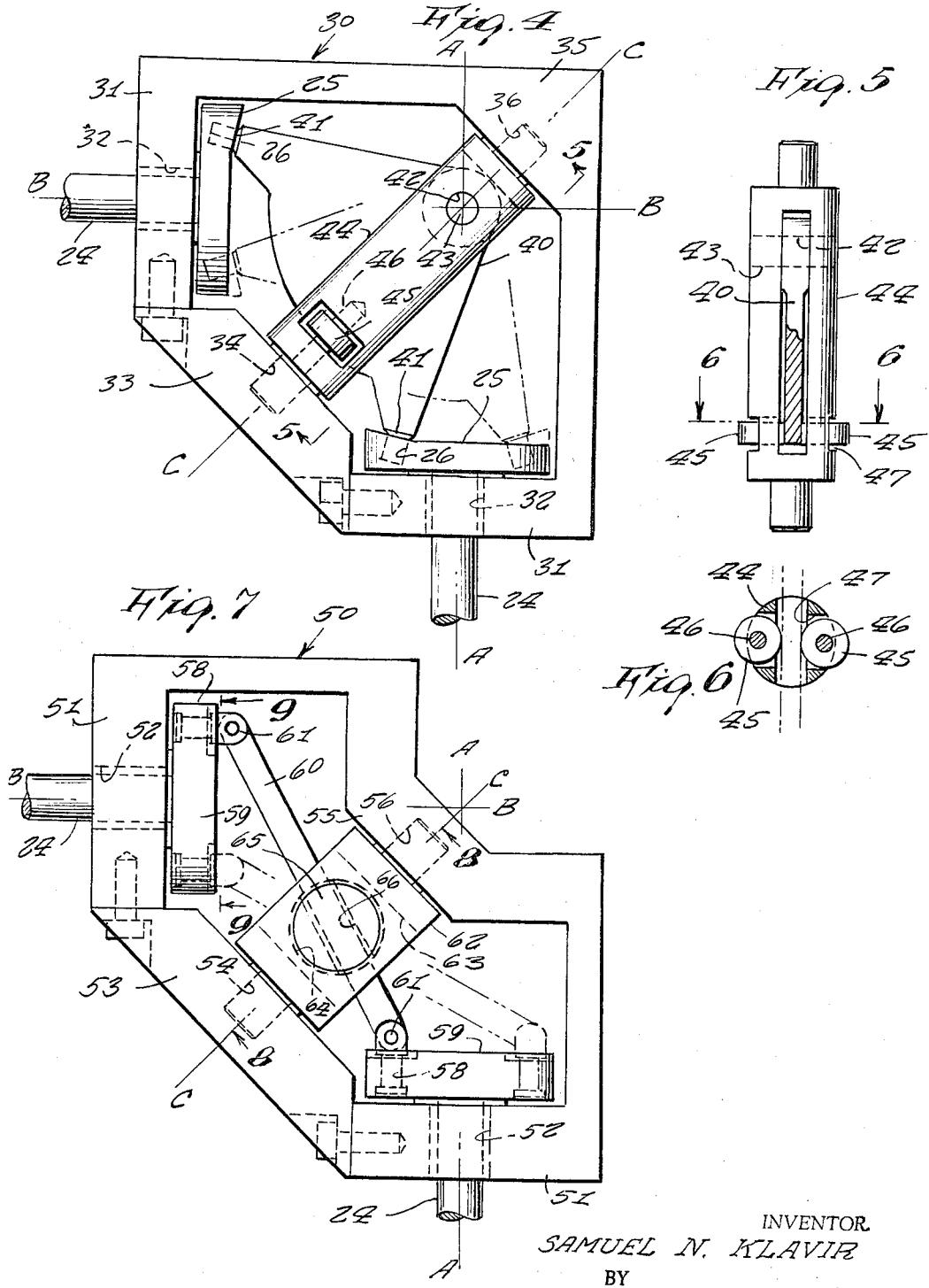

3,285,080
COUPLING FOR ANGULARLY DISPOSED SHAFTS
Samuel N. Klavir, Brooklyn, N.Y., assignor of fifty percent to Roth Seymour, Brooklyn, N.Y.
Filed Sept. 14, 1964, Ser. No. 396,305
5 Claims. (Cl. 74—66)

This invention relates generally to a motion transmitting device and more particularly to a mechanical linkage arrangement for transmitting rotation between a pair of angularly disposed shafts.

An object of the present connection is to provide a mechanical linkage connecting the ends of a pair of angularly disposed shafts to one another for transmission of rotation.

Another object of the present invention is to provide the foregoing connection for replacing a bevel gear drive.

Still another object of the present invention is to provide the foregoing connection which is relatively inexpensive, ruggedly constructed, and not readily subject to failure or malfunction.

And still another object of the present invention is to provide the foregoing connection pivotal on an axis which bisects an angle formed by the axes of rotation of the shafts which it interconnects.

The foregoing and other objects and advantages will become more fully understood by referring to the following description and the accompanying drawings wherein:

FIGURE 1 is a plan view of an angle drive connection for transmitting rotation between a pair of angularly disposed shafts made in accordance with the present invention, FIGURE 2 is a plan view of an arm fixed on the end of one of the shafts that is viewed in the plane 2—2 of FIGURE 1, FIGURE 3 is a sectional view of the connecting link taken on line 3—3 of FIGURE 1, FIGURE 4 is a plan view of a modified form of connection made in accordance with the present invention, FIGURE 5 is an elevational view of the link means of the modified connection taken in the plane 5—5 of FIGURE 4, FIGURE 6 is a sectional view taken on line 6—6 of FIGURE 5, FIGURE 7 is a plan view of another modified form of connection made in accordance with the present invention, FIGURE 8 is a sectional view of the linkage taken on line 8—8 of FIGURE 7, FIGURE 9 is a plan view of an arm similar to FIGURE 2 taken on the plane 9—9 of FIGURE 7, FIGURE 10 is a perspective view of one of the connecting means for the linkage of FIGURE 7.

Referring now to the drawings, and particularly to FIGURES 1 to 3, the novel connector has a casing 10 with a pair of spaced end walls 11 angularly disposed relative to one another, each having a central opening 12 therethrough. Casing 10 has a pair of spaced intermediate walls 13 and 15. Wall 13 has a recess or seat 14 while wall 15 has a seat of variable depth formed by a threaded through bore 16 and a threaded fastener adjustable therein.

Seat 14, bore 16 and fastener 17 are disposed on a pivot axis C—C which bisects an angle formed by a pair of axes A—A and B—B. A pair of shafts 24 are provided each having one end extending through opening 12 in one of the walls 11, one shaft being disposed on axis A—A and the other on axis B—B. Fixed to the end of each shaft 24 within casing 10 is an arm 25, shown in disc form, with a recess 26 in its outer end axially alined with the common intersection of axes A—A, B—B, and C—C.

A link assembly is provided comprising a pair of balls 18 disposed in part in seat 14 and bore 16, and a substantially triangular link member 20. Link member 20 has a recess at its apex cooperating with bore 16 to house one ball 18, and a pair of arm portions 21 each disposed in a recess 26. A slot 23 is provided between arm portions 21 cooperating with seat 14 to house the other ball 18.

Thus, as one shaft 24 rotates which rotates its arm 25, link member 20 pivots on ball 18 at the link member apex, the slot 23 moving on the other ball 18. Link member 20 also pivots on balls 18 on its pivot axis C—C. Such movement of link member 20 causes the other arm 25 to rotate together with the shaft 24 to which it is attached.

A modified form of coupling is shown in FIGURES 4 to 6 wherein casing 30 has end walls 31 with central openings 32 for shafts 24 having arms 25. Casing has spaced walls 33, being a cover plate, and 35 having recesses or seats 34 and 36, respectively alined on axis C—C. A link member 40 has arm portions 41 disposed in openings or recesses 26 and a bore 42 at the intersection of axes A—A, B—B, and C—C for a pin 43 which pivotally connects member 40 to a slotted shaft 44 having its ends pivotal in recesses 34 and 36 for rotation on axis C—C. In place of slot 23, pair of rollers 45 are disposed in a slot 47 in shaft 44 and are rotatably mounted on pins 46 to engage opposite sides of the member 40.

Another modified form of coupling is shown in FIGURES 7 to 10 wherein a casing 50 has similar end walls 51 with central openings 52 for shafts 24. A pair of spaced walls 53 and 55, wall 53 forming a casing cover plate, are provided with seat recesses 54 and 56, respectively, alined on axis C—C. A shaft member 62 is pivotally mounted at its ends in recesses 54 and 56 for rotation on axis C—C. Member 62 has a slot 63 transverse to axis C—C and a bore 64 transverse to axis C—C and slot 63. A cylindrical insert 65 is rotatably disposed in bore 64 and has a bore 66 therethrough communicating with slot 63 and cooperating therewith to provide a passage for a link member 60.

Link member 60 is pivotally connected at each end to a clevis 61 rotatably mounted in a bore 58 of an arm 59. Bore 58 is spaced from the axis of rotation of arm 59 which is shown in disk form connected to the end of the shafts 24 in place of an arm 25.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. In combination with a pair of rotatable shafts angularly disposed relative to one another, a coupling for transmitting rotation from one shaft to the other, comprising a casing fixed with respect to the rotation of the shaft; a pair of end walls on said casing each disposed normal to the axis of rotation of one of the shafts; each of the end walls having an opening therethrough and an end of one of the shafts extending through each of the openings into the casing; an arm fixed to the end of each shaft for rotation therewith; the casing having a pair of spaced walls between the end walls each having a seat therein alined with the seat of the other wall on an axis that substantially bisects an angle formed by the axes of rotation of the shafts; and link means pivotally supported in the seats and having end portions each pivotally connected to one of the arms spaced from the axis of rotation of the shaft connected to the arm, each of said arms having a recess axially alined with a common intersection of the axes of both shafts and the seats; and the link means comprising a substantially triangular member having an end portion at two apexes each disposed in the recess of one of the arms, a slot therebetween, and a seat at its third apex; and a pair of ball members one disposed in one of the seats of one spaced wall and in the slot, and the other disposed in the seats of the other spaced wall and link to pivotally connect the link to the casing.

2. The coupling, in combination, in accordance with claim 1 in which one of the seats of a spaced wall is comprised of a threaded bore therethrough; and a threaded member disposed in the bore terminating short of the end thereof to provide a recess in the bore variable in depth as determined by the end of the threaded member.

3. In combination with a pair of rotatable shafts angularly disposed relative to one another, a coupling for transmitting rotation from one shaft to the other, comprising a casing fixed with respect to the rotation of the shaft; a pair of end walls on said casing each disposed normal to the axis of rotation of one of the shafts; each of the end walls having an opening therethrough and an end of one of the shafts extending through each of the openings into the casing; an arm fixed to the end of each shaft for rotation therewith; the casing having a pair of spaced walls between the end walls each having a seat therein alined with the seat of the other wall on an axis that substantially bisects an angle formed by the axes of rotation of the shafts; and link means pivotally supported in the seats and having end portions each pivotally connected to one of the arms spaced from the axis of rotation of the shaft connected to the arm, each of said arms having a recess axially alined with a common intersection of the axes of both shafts and the seats; and the link means comprising a shaft journaled for rotation in the seats having an axial slot therethrough, a substantially triangular link disposed in the slot, pivotally connected to the shaft at one apex, and having an end portion at each of its other apexes pivotally journaled in the recess of one of the arms; the shaft having a slot therethrough transverse to the axial slot and alined with the link between the end portions; and a pair of rollers disposed in the transverse slot spaced from each other and rotatably connected to the shaft engaging opposite sides of the link.

4. In combination with a pair of rotatable shafts angularly disposed relative to one another, a coupling for transmitting rotation from one shaft to the other, comprising a casing fixed with respect to the rotation of the shaft; a pair of end walls on said casing each disposed normal to the axis of rotation of one of the shafts; each of the end walls having an opening therethrough and an end of one of the shafts extending through each of the openings into the casing; an arm fixed to the end of each shaft for rotation therewith; the casing having a pair of spaced walls between the end walls each having a seat therein alined with the seat of the other wall on an axis that substantially bisects an angle formed by the axes of rotation of the shafts; and link means pivotally supported in the seats and having end portions each pivotally connected to one of the arms spaced from the axis of rotation of the shaft connected to the arm, said link means comprising a shaft journaled in the seats of the spaced walls and having an axial slot therethrough and a bore normal to the slot; an insert rotatably disposed in the bore of the shaft and having an opening therethrough alined with the axial slot; and a link extending through the opening in the insert and the axial slot, the link being pivotally connected to the arms at its ends.

5. A coupling, in combination, in accordance with claim 4, wherein, each arm has an opening therethrough spaced from the axis of rotation of the shaft to which it is connected; and a clevis rotatably disposed in the opening in each arm and pivotally connected to one end of the link for connecting the ends of the link to the arms.

References Cited by the Examiner

UNITED STATES PATENTS

| 719,611 | 2/1903 | Robinson et al. | 64—20 |
| 2,640,335 | 6/1953 | Wingquist | 64—21 |

FOREIGN PATENTS

| 333,446 | 9/1903 | France. |
| 462,324 | 3/1951 | Italy. |
| 568,663 | 11/1957 | Italy. |

FRED C. MATTERN, JR., *Primary Examiner.*

BROUGHTON G. DURHAM, *Examiner.*

D. H. THIEL, *Assistant Examiner.*

UNITED STATES PATENT OFFICE
CERTIFICATE OF CORRECTION

Patent No. 3,285,080                                              November 15, 1966

Samuel N. Klavir

It is hereby certified that error appears in the above numbered patent requiring correction and that the said Letters Patent should read as corrected below.

In the heading to the printed specification, line 4, for "Roth Seymour" read -- Seymour Roth --.

Signed and sealed this 12th day of September 1967.

(SEAL)
Attest:

ERNEST W. SWIDER                                        EDWARD J. BRENNER
Attesting Officer                                           Commissioner of Patents